United States Patent [19]

Vinci et al.

[11] Patent Number: 5,849,348
[45] Date of Patent: Dec. 15, 1998

[54] DEODORIZED FATTY ACID SALT FEED SUPPLEMENT PRODUCT

[75] Inventors: Alfredo Vinci, Dayton; Kenneth R. Cummings, Skillman; M. Stephen Lajoie, Basking Ridge, all of N.J.

[73] Assignee: Church & Dwight Co., Inc., Princeton, N.J.

[21] Appl. No.: 97,063

[22] Filed: Jul. 23, 1993

[51] Int. Cl.[6] ........................................................ A23P 1/00
[52] U.S. Cl. .......................... 426/488; 426/69; 426/417; 426/442; 426/608; 426/648
[58] Field of Search ..................................... 426/442, 448, 426/608, 648, 417, 69

[56] References Cited

U.S. PATENT DOCUMENTS

| | | | |
|---|---|---|---|
| 4,853,233 | 8/1989 | McAskie | 426/623 |
| 5,204,023 | 4/1993 | Behan et al. | 426/534 |

*Primary Examiner*—John J. Gallagher
*Attorney, Agent, or Firm*—Irving Fishman

[57] ABSTRACT

In one embodiment this invention provides a process for preparing a deodorized fatty acid salt feed supplement. Primary amine reagent is added to a process medium in which $C_{14}$–$C_{22}$ fatty acid with a content of malodorous carbonyl compound is converted into a deodorized $C_{14}$–$C_{22}$ fatty acid alkaline earth metal salt product.

11 Claims, No Drawings

DEODORIZED FATTY ACID SALT FEED SUPPLEMENT PRODUCT

CROSS-REFERENCE TO RELATED PATENT APPLICATION

The subject matter of this patent application is related to that disclosed in patent application Ser. No. 853,966 Filed Mar. 20, 1992, (now U.S. Pat. No. 5,215,768)

BACKGROUND OF THE INVENTION

Conventional cattle feeds such as corn and alfalfa often fail to provide sufficient energy for cattle, especially lactating dairy cattle during periods of heavy milk production. Feed containing a high proportion of corn also has a tendency to depress the milk fat content of the milk produced by such cattle. Fat is a concentrated energy source, and it is known that if the proportion of fat in cattle feed is increased, lactating dairy cattle produce high milk yields without draining their reserves of body fat and without diminishing the proportion of milk fat in the milk produced.

However, it has been found that if the proportion of fat in the diet of cattle exceeds about 5% of the total feed solids, the feed has toxic effects upon the microorganisms in the rumen of the cattle. It appears that fat reduces the growth rate or even kills certain microorganisms which digest fiber in the cow's rumen, thereby lowering fiber digestibility. This deleterious effect on the cow's rumen is particularly true of unsaturated fats. Although the decreased fiber digestion in the rumen is partially compensated by greater fiber digestion in the lower parts of the alimentary canal, the total energy derived is less than that resulting from more complete microbial digestion in the rumen.

There has been a continuing need for new dietary supplements for animal feed which can be fed to ruminant animals without interfering with the rumen microorganisms, or being rendered ineffective by the rumen microorganisms.

U.S. Pat. Nos. 4,642,317; 4,826,694; 4,853,233; and 4,909,138 describe the incorporation of insoluble fatty acid salts in ruminant feed as a means of increasing the fat content of the feed without deleteriously affecting the ruminant digestion cycle. A feed additive such as fatty acid calcium salt functions as a rumen inert product which passes through the rumen without interfering with rumen fermentation (i.e., a rumen bypass product), and is subsequently metabolized in the abomasum or small intestine of the ruminant.

The fat content of a feed additive usually is derived from industrial tallow and oil byproduct sources. Commercially available fat and oil byproducts are mixtures of long chain fatty acids or glycerides, or a combination of fatty acid and glyceride mixtures. The commercial fatty acid materials typically are discolored, and have a characteristic unpleasant rancid odor which are caused by the presence of volatile oxygenated organic compounds such as ketones and aldehydes. Malodorous carbonyl compounds which are contained in technical grade fatty acid sources are illustrated by methyl heptyl ketone, methyl nonyl ketone, butanal, heptanal, nonanal, deca-2-enal, deca-2,4-dienal, and the like.

Various methods of deodorizing fatty acid materials are described in U.S. Pat. Nos. 2,265,020; 2,715,642; 2,795,453; 3,052,701; 3,124,460; 3,471,536; 3,526,649; 3,895,042; 4,294,821; and 4,938,957. The methods generally involve contacting a bulk fatty acid material with an adsorbent such as activated bentonite, or extracting the fatty acid material with a solvent such as furfural.

There is continuing interest in the development of improved methods for deodorizing commercial fatty acid materials which have been selected for incorporation into animal feedstocks.

Accordingly, it is an object of the invention to provide a fatty acid salt composition which can function as a rumen bypass animal feed supplement, and permit a beneficial increase in the dietary fat content of the feed.

It is another object of this invention to provide a process for preparing a deodorized fatty acid salt ruminant feed supplement.

Other objects and advantages of the present invention shall become apparent from the accompanying description and examples.

DESCRIPTION OF THE INVENTION

One or more objects of the present invention are accomplished by the provision of a process for the production of a deodorized fatty acid salt feed supplement product which comprises (1) forming an admixture of reactive ingredients comprising (a) at least one $C_{14}$–$C_{22}$ fatty acid which has a detectable content of malodorous carbonyl compound, (b) between about 0.8–1.5 equivalents of basic alkaline earth metal compound per equivalent of $C_{14}$–$C_{22}$ fatty acid, (c) between about 10–80 weight percent of an aqueous medium, based on the weight of fatty acid, and (d) between about 0.1–10 weight percent of R—$NH_2$ primary amine, based on the weight of fatty acid, where R in the primary amine formula is a $C_1$–$C_{10}$ organic substituent; and (2) recovering a deodorized fatty acid salt product after completion of the exothermic salt-forming reaction.

The exothermic salt-forming reaction medium typically is at a temperature between about 60°–110° C.

The $C_{14}$–$C_{22}$ fatty acid component of the salt-forming reaction medium of the invention process consists of one or more saturated or unsaturated carboxylic acids such as those derived from beef and mutton tallow, lard, cottonseed oil, palm oil, and the like.

Palm fatty acid distillate is a commercial product produced by distilling the fatty acids present in natural palm oil. A distillate product typically has the following weight percent content:

| | |
|---|---|
| Free fatty acids | 60–90 |
| Water | <1 |
| Triglycerides | 5–40 |
| Unsaponifiables | <3 |

The iodine value is less than 54 and the melting point is about 45° C. The fatty acids in the free fatty acids and the triglycerides consist of the following weight percent:

| | |
|---|---|
| Palmitic acid | 38–50 |
| Oleic acid | 35–40 |
| Linoleic acid | 5–10 |
| Stearic acid | 3–6 |
| Lauric acid | 1–3 |

Beef tallow acids are available commercially as a byproduct obtained by alkaline extraction of waste beef fat and subsequent acidification, and normally contain the following weight percent of fatty constituents:

|   |   |
|---|---|
| Free fatty acids | 60–90 |
| Triglycerides | 5–40 |
| Water | <1 |
| Unsaponifiables | <3 |

The iodine value is less than 50 and the melting point is 40°–45° C. The fatty acids in the free fatty acids and in the triglycerides have the following weight percent content:

|   |   |
|---|---|
| Palmitic acid | 22–28 |
| Oleic acid | 38–44 |
| Linoleic acid | 3–6 |
| Stearic acid | 18–24 |

Because $C_{14}$–$C_{22}$ fatty acids and glycerides are susceptible to atmospheric oxidation, it is advantageous to incorporate an oil-soluble antioxidant, and a chelating agent to bind any ferric, copper, zinc or other metal capable of catalyzing atmospheric oxidation. Suitable quantities for inclusion in the fatty acid bulk are about 0.03–0.1% or higher of antioxidant as permitted by regulation, and about 0.05–0.3% of chelating agent, based on the weight of fatty acid.

Illustrative of preferred additives are butylated hydroxytoluene antioxidant, and citric acid and ethylenediamine tetraacetate chelating agents. The chelating agent is added in an edible solvent such as propylene glycol to facilitate blending into the fatty acid.

The alkaline earth metal compound ingredient of the invention salt-forming process is at least one member selected from the group consisting of basic calcium and magnesium compounds, such as oxides, carbonates, carboxylates, hydroxides, and the like. The metal compound ingredient is present in a quantity between about 0.8–1.5 equivalents per equivalent weight of fatty acid ingredient.

The R—$NH_2$ primary amine ingredient is selected from basic amine compounds which are capable of reacting with a carbonyl compound in an addition type reaction to form a Schiff base under the exothermic fatty acid salt-forming conditions of the invention process. Suitable primary amine reagents include hydroxylamine, semicarbazide, phenylhydrazine, and basic aminoacid compounds such as arginine and lysine.

Deodorization is accomplished during the process by the reaction of volatile malodorous carbonyl compounds with the primary amine ingredient to form carbonyl-primary amine addition compounds:

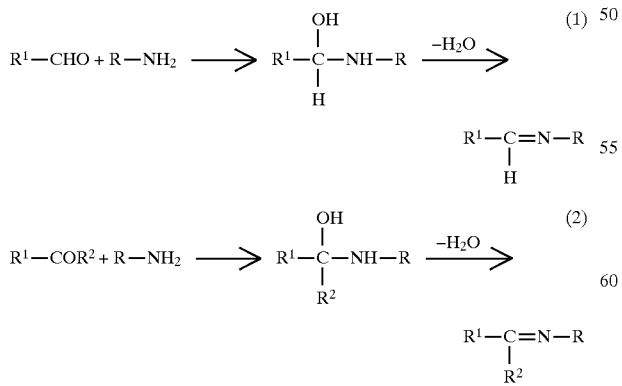

The carbonyl compounds have an olfactively detectable volatility at ambient temperatures, and the carbonyl-primary amine addition compounds are non-volatile solids at ambient temperatures. The initial unpleasant odor detectable in the fatty acid starting material is diminished or eliminated during the course of the invention process. An excess of primary amine ingredient is employed to react with any additional carbonyl compounds which are formed by air-oxidation during the elevated temperature stage of the salt-forming reaction. The solid carbonyl-primary amine addition compounds remain in the final feed supplement product of the process, and function as edible constituents having nutritional value.

In another embodiment the invention provides a deodorized feed supplement product in friable solid form which comprises (a) at least one $C_{14}$–$C_{22}$ fatty acid salt of an alkaline earth metal; and (b) between about 0.01–3 weight percent of carbonyl-primary amine Schiff base ingredient, based on the weight of $C_{14}$–$C_{22}$ fatty acid.

In a further embodiment this invention provides a deodorized feed supplement product in friable solid form which comprises (a) at least one $C_{14}$–$C_{22}$ fatty acid salt of an alkaline earth metal; (b) between about 0.01–3 weight percent of carbonyl-primary amine Schiff base ingredient, based on the weight of $C_{14}$–$C_{22}$ fatty acid; and (c) between about 0.05–20 weight percent of a biologically active ingredient, based on the weight of fatty acid.

The primary amine reactant which forms the carbonyl-primary amine addition compound has correspondence with the R—$NH_2$ primary amine ingredient of the invention fatty acid salt-forming process as described herein.

The biologically active ingredient of an invention animal feed composition can be selected from a broad variety of nutrients and medicaments, either as a single component or as a mixture of components, which are illustrated by the following listing of active molecular species:

1. $C_2$–$C_{22}$ aliphatic carboxylic acids and corresponding alkali metal, ammonium and alkaline earth metal salts which are different than the selected $C_{14}$–$C_{22}$ fatty acid ingredient of the process.

2. sugars and complex carbohydrates which include both water-soluble and water-insoluble monosaccharides, disaccharides and polysaccharides.

Cane molasses is a byproduct from the extraction of sucrose from sugar cane. It is commercially available at standard 79.5° Brix concentration, which has a water content of about 21 weight percent, and a sugar content of 50 weight percent. Sugar beet byproducts also are available as low cost carbohydrate sources.

Whey is a byproduct of the dairy industry. The whey is a dilute solution of lactalbumin, lactose, fats, and the soluble inorganics from milk. Dried whey solids typically have the following composition:

|   |   |
|---|---|
| Protein | 12.0% |
| Fat | 0.7% |
| Lactose | 60.0% |
| Phosphorus | 0.79% |
| Calcium | 0.87% |
| Ash | 9.7% |

Another source of carbohydrate is derived from the pulp and paper industry which produces large quantities of byproduct lignin sulfonates from wood during the sulfite pulping process. The carbohydrate byproduct is contained in the spent sulfite liquor.

3. aminoacid ingredients either singly or in combination which include, histidine, isoleucine, leucine, methionine, phenylalanine, threonine, tryptophan, valine, tyrosine ethyl HCl, alanine, aspartic acid, sodium glutamate, glycine, proline, serine, cysteine ethyl HCl, and the like, and analogs and salts thereof.

4. vitamin ingredients either singly or in combination which include thiamine HCl, riboflavin, pyridoxine HCl, nicotinic acid, nicotinamide, inositol, choline chloride, calcium pantothenate, biotin, folic acid, ascorbic acid, vitamin $B_{12}$, p-aminobenzoic acid, vitamin A acetate, vitamin K, vitamin D, vitamin E, and the like.

Trace element ingredients include compounds of cobalt, copper, manganese, iron, zinc, tin, nickel, chromium, molybdenum, iodine, chlorine, silicon, vanadium, selenium, calcium, magnesium, sodium and potassium.

5. protein ingredients as obtained from sources such as dried blood or meat meal, cottonseed meal, soy meal, rape seed meal, linseed meal, peanut meal, dehydrated alfalfa, dried and sterilized animal and poultry manure, fish meal, liquid or powdered egg, fish solubles, cell cream, and the like.

Protein equivalent ingredients include non-protein nitrogen compounds such as urea, biuret, ammonium phosphate, and the like.

6. medicament ingredients either singly or in combination which include promazine hydrochloride, chloromadionate acetate, chlorotetracycline, sulfamethazine, monensin, sodium monensin, poloxaline, and the like. Oxytetracycline is a preferred antibiotic for cattle prophylaxis.

7. enzymes such as lipolytic proteins which aid feed digestibility, e.g., by lipase hydrolysis of fatty acid glycerides to free fatty acid and glycerol.

Other optional ingredients such as antioxidants, preservatives and surfactants can be incorporated in the invention process for production of feed supplement products.

Antioxidants are illustrated by butylated hydroxyanisole, butylated hydroxytoluene, tertiary-butylhydroquinone, propyl gallate, and ethoxyquin; and suitable preservatives include sodium sorbate, potassium sorbate, sodium benzoate, propionic acid, α-hydroxybutyric acid, and the like.

Suitable suspension stabilizing agents preferably are selected from nonionic surfactants, hydrocolloids and cellulose ethers. These types of chemical agents are illustrated by polyethylene oxide condensates of phenols, $C_8$–$C_{22}$ alcohols and amines; ethylene oxide reaction products with fatty acid partial esters of hexitans; alkylarylpolyoxyethylene glycol phosphate esters; gum arabic; carob bean gum; guar gum; tragacanth gum; ammonium, sodium, potassium and calcium alginates; glycol alginates; xanthan gum; potato agar; alkylcellulose; hydroxyalkylcellulose; carboxyalkylcellulose; and the like.

The invention process can be conducted in a batch reactor or as a continuous operation. The fatty acid, alkaline earth metal compound, primary amine and aqueous medium can be admixed simultaneously, or the fatty acid and alkaline earth metal compound can be blended first and then combined with the other processing components.

In one processing method the fatty acid is heated to 80°–110° C. or higher, and then mixed with the alkaline earth metal compound. After the aqueous medium and primary amine are added to the mixture, there is a short induction period which is followed by exothermic alkaline earth metal compound hydrating and fatty acid salt-forming reactions.

The amount of aqueous medium employed is sufficient to support the metal compound hydrating and fatty acid salt-forming reactions, and preferably is vaporized as steam during the exothermic reaction period to yield a friable fatty acid salt product which in granule form is suitable for use as an animal feed supplement.

The primary amine reagent can be added as a separate component, either initially or at a later stage of the reaction process, or it can be premixed with the aqueous medium stream. In a preferred embodiment, the primary amine is added in the form of a water-soluble acid salt, such as hydroxylamine hydrochloride or sulfate, semicarbazide hydrochloride, phenylhydrazine hydrochloride, and the like.

If an additional biologically active ingredient is included in the processing formulation, it can be premixed with the $C_{14}$–$C_{22}$ fatty acid, or with the aqueous medium, as determined by the fat-solubility or water-solubility of the biologically active ingredient.

A present invention fatty acid salt product is adapted to function as a rumen bypass dietary supplement in ruminant feed. An important advantage of a present invention feed supplement composition is the rumen bypass protection which extends to all the biologically active ingredients of the composition, which normally are metabolized in the rumen.

An invention dietary supplement product has little or no detectable unpleasant odor. Optionally, an odor-modifying compound can be added to the product to mask any residual rancid odor.

It is advantageous to include one or more additives which impart improved flavor and aroma to an invention dietary supplement product. Flavorant additive can be categorized as natural, artificial and WONF (with other natural flavorants).

Suitable flavorant additives which exhibit flavor and aroma enhancing organoleptic properties generally are organic compounds which correspond to structure classifications such as aliphatic and aromatic alcohols, furan ethers, thiazole alcohols, pyridine ethers and alcohols, benzofuran carbonyl compounds, aliphatic and aromatic ketones, α-diketones, pyrrole-α-diketones, aromatic sulfur compounds, phenols and phenol ethers, and the like, as recited in U.S. Pat. No. 3,702,253.

Flavorant additives are illustrated by compounds such as anethole, benzaldehyde, bergamot oil, acetoin, carvol, cinnamaldehyde, citral, ethylvanillin, vanillin, thymol, methyl salicylate, coumarin, anise, cinnamon, ginger, clove, lemon oil, 1-undecanol, 5-dodecalactone, eugenol, geraniol, geranyl acetate, guaiacol, limonene, linalool, piperonal, 2-acetyl-5-methylpyrazine, 2-ethyl-3-methoxypyrazine, 5-methylquinoxaline, 2-methyl-6-propylpyrazine, 2-methylbenzofuran, 2,2'-dithienylmethane, benzyl hexyl carbinol, furfuryl phenyl ether, difurfuryl ether, benzofuran-2-aldehyde, benzothiophene-2-aldehyde, 1-butylpyrrole-2-aldehyde, methyl decyl ketone, dipropyl ketone, ethyl benzyl ketone, 2,6-diacetylpyridine, heptane-3,4-dione, methyl thiophene-2-carboxylate, 2-hydroxyacetophenone, 4-ethyl-2-methoxyphenol, 2-oxobutan-1-ol, and the like.

The following Examples are further illustrative of the present invention. The components and specific ingredients are presented as being typical, and various modifications can be derived in view of the foregoing disclosure within the scope of the invention.

EXAMPLE I

This Example illustrates the continuous production of fatty acid calcium salt feed supplement product in accordance with the present invention.

The fatty acid component is a palm fatty acid distillate of the following composition:

| | |
|---|---|
| Lauric acid | 3.3% |
| Palmitic acid | 49.9% |
| Stearic acid | 5.4% |
| Oleic acid | 35.0% |
| Linoleic acid | 7.4% |

A residual effluent aqueous medium is obtained from a Church & Dwight Co., Inc. sodium bicarbonate manufacturing plant in Old Fort, Ohio. The aqueous medium contains about 4.2% sodium carbonate-bicarbonate. Hydroxylamine hydrochloride is added to the aqueous medium, in a quantity which is 1.5 equivalents per equivalent of malodorous ketone and aldehyde impurities in the fatty acid distillate.

The process is operated continuously with equipment which is essentially the same as described and illustrated with reference to FIG. 1 of U.S. Pat. No. 4,826,694 by W. McAskie.

Calcium oxide from a hopper and hot palm oil distillate (96° C.) from a supply line are mixed in predetermined proportions in a mixing pump. The residual effluent aqueous medium containing dissolved hydroxylamine is added to the reactant blend by a supply line.

The hydrated mixture is passed through a mixing pump and the resultant semi-liquid reaction medium at about 100° C. is discharged as a spread layer onto a continuously moving conveyor belt. Steam evolves from the conveyor transported reaction mass.

At the end of the conveyor belt solid lumps of reaction product fall through a sizing machine onto a second conveyor belt. In this conveying zone the salt-forming reaction and evolution of water proceed to completion. The essentially dry fatty acid calcium salt product is passed through a sifter, and collected in bags suitable for transportation and storage.

The residence time on the first conveyor is about 30 minutes, and the overall production time from reactant mixing to collection of the dry granulated product is about 2.25 hours.

The final product has a total fatty acid calcium salt content of 85 weight percent, and an ash content of about 15 weight percent.

The invention fatty acid calcium salt product can be incorporated as a dietary supplement in cattle feed such as hay silage or corn silage, in a calculated quantity which will provide each animal about 1000 grams per day of fatty acid salt.

The unpleasant rancidity characteristic of the palm fatty acid distillate starting material is not detectable in the fatty acid calcium salt product.

The continuous process is repeated, except that semicarbazide hydrochloride is dissolved in the aqueous medium in place of hydroxylamine, and vanillin is added to the granulated product before it is bagged for transportation and storage.

Under the processing conditions, the water-soluble primary amine hydrochloride ingredient is neutralized to the free primary amine base, and the hydrochloride is converted to sodium chloride.

EXAMPLE II

This Example illustrates the preparation of an invention fatty acid calcium salt feed supplement product containing an aminoacid.

A liquid nutrient formulation is prepared from the following ingredients:

| | Parts |
|---|---|
| Potassium oleate | 500 |
| Potassium stearate | 200 |
| Potassium palmitate | 100 |
| Methionine hydroxy analog | 200 |
| (Total volatile carbonyl impurities in fatty acids) | (12) |

The ingredients are added in the listed order to 1000 parts of water (containing 50 parts of dissolved 1,2-propylene glycol) with high speed stirring.

The viscosity of the resultant emulsion is measured on a Brookfield viscometer with a number 6 spindle at 12 rpm. The emulsion has a viscosity of about 400 centipoises, and a pH of 10.

Another emulsion is prepared in the described manner except that two parts of guar gum are added to the water before the other ingredients. The measured viscosity of the emulsion is about 1050 centipoises.

Another emulsion is prepared except that 20 parts of sucrose are dissolved in the water before the other ingredients are added. The viscosity of the emulsion is about 950 centipoises.

Each of the three liquid formulations, respectively, is added to the primary amine-containing aqueous medium described in Example I, and a granular feed supplement product is produced in accordance with the continuous process of Example I.

What is claimed is:

1. A process for the production of a deodorized fatty acid salt feed supplement product which comprises (1) forming an admixture of reactive ingredients comprising (a) at least one $C_{14}$–$C_{22}$ fatty acid which has a detectable content of malodorous carbonyl compound, (b) between about 0.8–1.5 equivalents of basic alkaline earth metal compound per equivalent of $C_{14}$–$C_{22}$ fatty acid, (c) between about 10–80 weight percent of an aqueous medium, based on the weight of fatty acid, and (d) between about 0.1–10 weight percent of R—$NH_2$ primary amine, based on the weight of fatty acid, where R in the primary amine formula is a $C_1$–$C_{10}$ organic substituent; and (2) recovering a deodorized fatty acid salt product after completion of the exothermic salt-forming reaction.

2. A process in accordance with claim 1 wherein the fatty acid ingredient is a mixture comprising 0–10 percent lauric acid, 0–60 percent palmitic acid, 0–10 percent stearic acid, 0–60 percent oleic acid, and 0–10 percent linoleic acid.

3. A process in accordance with claim 1 wherein the content of carbonyl compound is between about 0.01–3 weight percent, based on the weight of $C_{14}$–$C_{22}$ fatty acid ingredient.

4. A process in accordance with claim 1 wherein the alkaline earth metal ingredient is a basic calcium compound or magnesium compound or a mixture thereof.

5. A process in accordance with claim 1 wherein the primary amine is hydroxylamine.

6. A process in accordance with claim 1 wherein the primary amine is semicarbazide.

7. A process in accordance with claim 1 wherein the primary amine is phenylhydrazine.

8. A process in accordance with claim 1 wherein water evaporation occurs during the salt-forming reaction, and the salt product is recovered in the form of friable granules.

9. A process in accordance with claim 1 wherein the primary amine is in the form of a water-soluble acid salt.

10. A process in accordance with claim 1 wherein the primary amine and aqueous medium are premixed before admixture with the other process ingredients.

11. A process in accordance with claim 1 wherein the exothermic salt-forming reaction medium is at a temperature between about 60°–110° C.

* * * * *